US007763664B2

(12) United States Patent
Bonn et al.

(10) Patent No.: US 7,763,664 B2
(45) Date of Patent: Jul. 27, 2010

(54) DEFOAMING AGENT AND/OR DEAERATOR FOR AQUEOUS MEDIA TENDING TO FOAM

(75) Inventors: Johann Bonn, Hessheim (DE); Klaus Lorenz, Worms (DE); Joerg Wehrle, Heppenheim (DE); Manfred Matz, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 833 days.

(21) Appl. No.: 10/519,405

(22) PCT Filed: Jul. 16, 2003

(86) PCT No.: PCT/EP03/07703

§ 371 (c)(1),
(2), (4) Date: Jan. 5, 2005

(87) PCT Pub. No.: WO2004/012843

PCT Pub. Date: Feb. 12, 2004

(65) Prior Publication Data

US 2006/0111453 A1 May 25, 2006

(30) Foreign Application Priority Data

Jul. 24, 2002 (DE) ................ 102 33 701

(51) Int. Cl.
 *B01D 19/04* (2006.01)
 *D21C 3/28* (2006.01)
 *D21H 21/12* (2006.01)
 *B01F 3/12* (2006.01)

(52) U.S. Cl. .................. 516/73; 516/131; 516/77; 106/504; 162/75; 162/179

(58) Field of Classification Search .......... 516/131, 516/73, 77; 106/504; 162/158, 179, 72, 162/75
See application file for complete search history.

(56) References Cited

U.S. PATENT DOCUMENTS

| 4,626,377 | A | | 12/1986 | Kavchok et al. | |
|---|---|---|---|---|---|
| 4,950,420 | A | | 8/1990 | Svarz | |
| 5,326,499 | A | * | 7/1994 | Wegner et al. | ........ 516/133 |
| 5,700,351 | A | * | 12/1997 | Schuhmacher et al. | ........ 516/132 |
| 6,251,958 | B1 | | 6/2001 | Pichai et al. | |
| 6,340,662 | B1 | * | 1/2002 | Millhoff et al. | ........ 516/55 |
| 6,864,292 | B1 | * | 3/2005 | Dyllick-Brenzinger et al. | ... 516/132 |

FOREIGN PATENT DOCUMENTS

| DE | 30 01 387 | | | 7/1981 |
|---|---|---|---|---|
| DE | 198 57 204 | A | * | 6/2000 |
| EP | 0 531 713 | | | 3/1993 |
| EP | 662 172 | | | 7/1995 |
| EP | 0 723 795 | | | 7/1996 |
| EP | 0 732 134 | | | 9/1996 |
| JP | 2000-230084 | A | * | 8/2000 |
| WO | 94 20680 | | | 9/1994 |
| WO | 00 44470 | | | 8/2000 |

OTHER PUBLICATIONS

Derwent Abstract on East, week 200108, London: Derwent Publications Ltd., AN 2000-631444, Class A23, JP 2000230084 A, (Asahi Denka Kogyo KK), abstract.*
Machine Translation of JP 2000230084 A online @ http://www19.ipdl.inpit.go.jp/PA1/cgi-bin/PA1INDEX , pp. 1-11 (printed Mar. 2007).*

\* cited by examiner

*Primary Examiner*—Daniel S Metzmaier
(74) *Attorney, Agent, or Firm*—Oblon, Spivak, McClelland, Maier & Neustadt, L.L.P.

(57) ABSTRACT

A defoaming agent and/or deaerator for aqueous foamable media based on oil-in-water dispersions. The oil phase contains at least one compound from fatty alcohols, fatty acid monoglycerides, diglycerides, and triglycerides, fatty acid ester of fatty acids and monovalent to trivalent alcohols, 3-thiaalkane-1-ole, 3-thiaoxide alkane-1-ole, 3-thiadioxide-alkane-ole, and thiaalkane esters in combination with (i) at least one polyglycerine that is obtained by esterification of at least 20 percent of polyglycerine with 12 to 36 C carboxylic acid, and
(ii) at least one bisamide consisting of ethylene diamine and 10 to 36 C atom carboxylic acids, while the aqueous phase thereof contains at least one stabilizer, water, and an optional thickener, for aqueous media that tend to foam. Also disclosed are methods of controlling foam by adding the dispersions to a process, particularly during cellulose boiling, cellulose washing, grinding of paper pulp, paper production, and dispersion of pigments used for paper production.

18 Claims, No Drawings

DEFOAMING AGENT AND/OR DEAERATOR FOR AQUEOUS MEDIA TENDING TO FOAM

The present invention relates to antifoams and/or deaerators based on oil-in-water dispersions whose oil phase contains at least one hydrophobic compound and whose aqueous phase contains at least one stabilizer, water and, if required, a thickener, for aqueous media which tend to form foam, and to the use of the antifoams and/or deaerators for foam control of aqueous media which tend to form foam, in particular for foam control in pulp cooking, pulp washing, the beating of paper stock, papermaking and the dispersing of pigments for papermaking.

DE-A-30 01 387 discloses aqueous emulsifier-containing oil-in-water emulsions which contain aliphatic alcohols having relatively high melting points and hydrocarbons which are liquid at room temperature. The oil phase of the oil-in-water emulsions can, if required, also contain further components acting as antifoams, for example nonaromatic hydrocarbons, fatty acids or derivatives thereof having relatively high melting points, for example fatty acid esters, beeswax, Carnauba wax, Japan wax and montan wax.

EP-A-0 531 713 discloses antifoams based on oil-in-water emulsions whose oil phase contains an alcohol of at least 12 carbon atoms, fatty acid esters of alcohols of at least 22 carbon atoms and $C_1$- to $C_{36}$-carboxylic acids, or fatty acid esters of $C_{12}$- to $C_{22}$-carboxylic acids with monohydric to trihydric $C_1$- to $C_{18}$-alcohols or a hydrocarbon having a boiling point above 200° C. or fatty acids of 12 to 22 carbon atoms in combination with polyglyceryl esters which are obtainable by at least 20% esterification of polyglycerol mixtures with at least one fatty acid of 12 to 36 carbon atoms. These oil-in-water emulsions, too, are stabilized with the aid of a water-soluble emulsifier.

EP-A-0 662 172 discloses antifoams based on oil-in-water emulsions, which are used, for example, as antifoams in paper mills and which are still sufficiently effective even at relatively high temperatures of the water circulations. Such antifoams contain, in the oil phase,
(a) fatty acid esters of $C_{12}$- to $C_{22}$-carboxylic acids with monohydric to trihydric $C_1$- to $C_{22}$-alcohols,
(b) polyglyceryl esters which are obtainable by at least 20% esterification of polyglycerols which have at least 2 glycerol units with at least one $C_{12}$- to $C_{36}$-fatty acid and
(c) fatty acid esters of $C_{12}$- to $C_{22}$-carboxylic acids and polyalkylene glycols, the molar mass of the polyalkylene glycols being up to 5 000 g/mol. The hydrophobic phase can, if required, contain further components, such as alcohols of at least 12 carbon atoms or hydrocarbons having a boiling point above 200° C. These oil-in-water emulsions are likewise stabilized with the aid of an emulsifier.

EP-A-0 732 134 discloses antifoams and/or deaerators based on oil-in-water emulsions for aqueous media which tend to form foam, the oil phase of the emulsions containing
(a) at least one alcohol of at least 12 carbon atoms, distillation residues which are obtainable in the preparation of alcohols having a relatively high number of carbon atoms by oxo synthesis or by the Ziegler process, or mixtures of said compounds, and
(b) at least one ester of a sugar alcohol having at least 4 OH groups or at least 2 OH groups and at least one intramolecular ether bond and a fatty acid of at least 20 carbon atoms in a molar ratio of 1 to at least 1, it being possible for some or all of the free OH groups of these esters to be esterified with $C_{12}$- to $C_{18}$-carboxylic acids.

The hydrophobic phase can, if required, contain further antifoam compounds, such as fatty acid esters of alcohols of at least 22 carbon atoms and $C_1$- to $C_{36}$-carboxylic acids, polyethylene waxes, natural waxes, hydrocarbons having a boiling point above 200° C. or fatty acids of 12 to 22 carbon atoms.

U.S. Pat. No. 4,950,420 discloses antifoams for the paper industry which contain from 10 to 90% by weight of a surface-active polyether, such as polyalkoxylated glycerol or polyalkoxylated sorbitol, and from 10 to 90% by weight of a fatty acid ester of polyhydric alcohols, such as mono- or diesters of fatty acids and polyethylene glycol and/or polypropylene glycol, the antifoams being free of any oils, amides, hydrophobic silica or silicones.

WO-A-00/44470 discloses antifoams and/or deaerators based on oil-in-water dispersions, which contain, in the hydrophobic oil phase, 3-thiaalkan-1-ols, 3-thiaoxoalkan-1-ols, 3-thiadioxoalkan-1-ols, esters of said compounds or mixtures thereof as antifoam or deaerating compounds.

WO-A-94/20680 discloses aqueous dispersions which can be used as antifoams and ethylenebisstearamide or other aliphatic diamides together with at least one compound from the group-consisting of the mono- and diesters of polyethylene glycol and fatty acids, sulfonated mineral oils and ethoxylation products of alcohols of 10 to 14 carbon atoms.

Most known antifoam systems have the disadvantage that their action is often insufficient at elevated temperatures, for example above 50° C., or considerable amounts have to be used in order to achieve sufficient degassing and/or defoaming during the continuous papermaking process.

It is an object of the present invention to provide antifoams and/or deaerators for aqueous media which tend to form foam, which antifoams and/or deaerators are to have sufficient efficiency in particular at above 50° C. even when metered in the otherwise usual amounts.

We have found that this object is achieved, according to the invention, by antifoams and/or deaerators based on oil-in-water dispersions whose oil phase contains at least one compound from the group consisting of the alcohols of at least 12 carbon atoms, alkoxylated fatty alcohols, mono-, di- and triglycerides of fatty acids, fatty acid esters of carboxylic acids of at least 12 carbon atoms and monohydric to tetrahydric alcohols of 1 to 24 carbon atoms, hydrocarbons having a boiling point above 200° C., fatty acids of 12 to 26 carbon atoms, 3-thiaalkan-1-ols, 3-thiaoxoalkan-1-ols, 3-thiadioxoalkan-1-ols and esters of thiaalkane compounds and whose aqueous phase contains at least one stabilizer, water and, if required, a thickener, if the oil-in-water dispersions contain,
(i) at least one polyglyceryl ester which is obtainable by at least 20% esterification of polyglycerol with a carboxylic acid of 12 to 36 carbon atoms and
(ii) at least one bisamide of ethylenediamine and carboxylic acids of 10 to 36 carbon atoms.

The present invention also relates to the use of mixtures of
(i) at least one polyglyceryl ester which is obtainable by at least 20% esterification of polyglycerol with a carboxylic acid of 12 to 36 carbon atoms and
(ii) at least one bisamide of ethylenediamine and carboxylic acids of 10 to 36 carbon atoms as an additive for antifoams and/or deaerators based on oil-in-water dispersions, and to the use of the antifoams and/or deaerators for foam control of aqueous media which tend to form foam, in particular for foam control in pulp cooking, pulp washing, the beating of paper stock, papermaking and the dispersing of pigments for papermaking.

Suitable compounds which form the hydrophobic phase of the oil-in-water dispersions are known from the literature stated in connection with the prior art, cf. DE-A-30 01 387, EP-A-0 531 713, EP-A-0 662 172, EP-A-0 732 134 and WO-A-00/44470. All compounds which are known to be antifoams and/or deaerators, for example $C_{12}$- to $C_{48}$-alcohols, such as myristyl alcohol, cetyl alcohol, stearyl alcohol, palmityl alcohol, tallow fatty alcohol and behenyl alcohol, and synthetic alcohols, for example saturated, straight-chain, unbranched alcohols obtainable by the Ziegler process by oxidation of alkylaluminums, can be used as the hydrophobic phase. Synthetic alcohols are also obtained by oxo synthesis. These are as a rule alcohol mixtures. The alcohols may contain, for example, up to 48 carbon atoms in the molecule. Very effective antifoams contain, for example, mixtures of at least one $C_{12}$- to $C_{26}$-alcohol and at least one fatty alcohol having 28 to 48 carbon atoms in the molecule, cf. EP-A-0 322 830. Instead of the pure alcohols, it is also possible to use, as antifoam compounds, distillation residues which are obtainable in the preparation of alcohols having a relatively large number of carbon atoms by oxo synthesis or by the Ziegler process. Further compounds which are suitable as antifoams and/or deaerators are alkoxylated alcohols and alkoxylated distillation residues which are obtained in the preparation of alcohols by oxo synthesis or by the Ziegler process. The alkoxylated compounds are obtainable by reacting the long-chain alcohols or distillation residues with ethylene oxide or with propylene oxide or with a mixture of ethylene oxide and propylene oxide. Here, first ethylene oxide and then propylene oxide can be subjected to an addition reaction with the alcohols or the distillation residues or the addition reaction can be carried out first with propylene oxide and then with ethylene oxide. In general, up to 5 mol of ethylene oxide or propylene oxide undergo the addition reaction per OH group of the alcohol. Particularly preferred from the group consisting of the alkoxylated compounds are those reaction products which are prepared by an addition reaction of 1 or 2 mol of ethylene oxide with 1 mol of fatty alcohol or distillation residue.

The abovementioned fatty alcohols having at least 12 carbon atoms in the molecule are generally used together with other compounds likewise having an antifoam action. Such compounds are, for example, fatty acid esters of $C_{12}$- to $C_{26}$-carboxylic acids, preferably of $C_{12}$-$C_{22}$-carboxylic acids, with monohydric to tetrahydric, preferably monohydric to trihydric, $C_1$-$C_{24}$-alcohols, preferably $C_1$-$C_{22}$-alcohols and more preferably $C_3$-$C_{18}$-alcohols. The fatty acids on which these esters are based are, for example, lauric acid, myristic acid, palmitic acid, stearic acid, arachidic acid, behenic acid, lignoceric acid and cerotic acid. Palmitic acid, stearic acid or behenic acid is preferably used. Monohydric $C_1$- to $C_{24}$-alcohols can be used for esterifying said carboxylic acids, e.g. methanol, ethanol, propanol, butanol, hexanol, dodecanol, stearyl alcohol and behenyl alcohol, or dihydric alcohols, such as ethylene glycol, trihydric alcohols, e.g. glycerol or tetrahydric alcohols such as for example pentaaerythritol. Trihydric alcohols such as glycerol are preferred. The polyhydric alcohols may be completely or only partially esterified.

Further antifoam and deaerating compounds are polyglyceryl esters. Such esters are prepared, for example, by esterifying polyglycerols which contain at least 2 glycerol units with at least one $C_{12}$- to $C_{36}$-carboxylic acid. The polyglycerols on which the esters are based are esterified to such an extent that compounds which are virtually no longer soluble in water form. The polyglycerols are obtainable, for example, by alkali-catalyzed condensation of glycerol at relatively high temperatures or by reaction of epichlorohydrin with glycerol in the presence of acidic catalysts. The polyglycerols usually contain from at least 2 to about 30, preferably from 2 to 12, glycerol units. Commercial polyglycerols contain mixtures of polymeric glycerols, for example mixtures of diglycerol, triglycerol, tetraglycerol, pentaglycerol and hexaglycerol and, if required, polyglycerols having a higher degree of condensation. The degree of esterification of the OH groups of the polyglycerols is from at least 20 to 100, preferably from 60 to 100, %. The long-chain fatty acids used for the esterification may be saturated or ethylenically unsaturated. Suitable fatty acids are, for example, lauric acid, myristic acid, palmitic acid, stearic acid, arachidic acid, behenic acid, oleic acid, hexadecenoic acids, elaidic acid, eicosenoic acids, docosenoic acids, such as erucic acid, or polyunsaturated acids, such as octadecenedienoic acids and octadecenetrienoic acids, e.g. linoleic acid and linolenic acid, and mixtures of said carboxylic acids. Polyglyceryl esters suitable as antifoams are described, for example, in EP-A-0 662 172.

Other compounds which are suitable as antifoams and/or deaerators for aqueous media which tend to form foam, which compounds are used either alone or together with at least one alcohol of at least 12 carbon atoms, are esters of a sugar alcohol having at least 4 OH groups or at least 2 OH groups and at least one intramolecular ether bond and a fatty acid having at least 20 carbon atoms in the molecule in a molar-ratio of 1 to at least 1, it being possible for some or all of the free OH groups of these esters to be esterified with $C_{12}$- to $C_{18}$-carboxylic acids. Esters of tetritols, pentitols and/or hexitols with fatty acids of at least 22 carbon atoms in a molar ratio of 1 to at least 1.9 are preferably used. Esters of mannitol and/or sorbitol with behenic acid in a molar ratio of 1 to at least 1, preferably 1 to at least 1.9, are particularly preferably used. In addition to the suitable sugar alcohols sorbitol and mannitol, adonitol, arabitol, xylitol, dulcitol, pentaerythritol, sorbitan and erythritol are suitable. Sugar alcohols are understood as meaning the polyhydroxy compounds which are formed from monosaccharides by reduction of the carbonyl function and which are not themselves sugars. The anhydro compounds which form from sugar alcohols as a result of intramolecular elimination of water may also be used. Particularly effective antifoams and/or deaerators are obtained when sugar alcohols are esterified with $C_{22}$- to $C_{30}$-fatty acids. If the sugar alcohols are only partly esterified with a fatty acid of at least 20 carbon atoms, the unesterified OH groups of the sugar alcohol can be esterified with another carboxylic acid, for example a $C_{12}$- to $C_{18}$-carboxylic acid. Esters of this type are described in EP A-0 732 134.

The hydrophobic phase of the antifoams and/or deaerators may furthermore contain from 1 to 100% by weight of a 3-thiaalkan-1-ol, 3-thiaoxoalkan-1-ol or 3-thiadioxoalkan-1-ol, of an ester of said compounds or of mixtures thereof. It preferably contains from 5 to 75% by weight of a 3-thia-$C_{16}$- to $C_{30}$-alkan-1-ol, 3-thiaoxo-$C_{16}$- to $C_{30}$-alkan-1-ol or 3-thiadioxo-$C_{16}$- to $C_{30}$-alkan-1-ol or of a mixture thereof. Particularly preferred antifoams and/or deaerators are those whose hydrophobic phase contains from 5 to 85% by weight of a 3-thia-$C_{18}$- to $C_{28}$-alkan-1-ol.

Further compounds suitable as antifoams and/or deaerators are ketones having melting points above 45° C. They are generally used together with fatty alcohols whose melting points are above 40° C. Such antifoam mixtures are disclosed in EP A-0 696 224. The reaction products, disclosed in DE-A 196 41 076, of, for example, mono- and/or diglycerides with dicarboxylic acids and reaction products of glycerol with dicarboxylic acids, which reaction products are esterified with at least one $C_{12}$- to $C_{36}$-fatty acid, are also suitable as an additive for the hydrophobic phase of the novel antifoams and/or deaerators.

Other compounds which enhance the efficiency of long-chain alcohols as antifoams and are therefore also used in antifoam mixtures are, for example, polyethylene waxes having a molar mass of at least 2 000 and natural waxes, such as beeswax or Carnauba wax.

A further component of antifoam mixtures comprises hydrocarbons having a boiling point above 200° C. (determined at atmospheric pressure). Preferably used hydrocarbons are liquid paraffins, for example the commercially available paraffin mixtures, which are also referred to as white oil. Paraffins whose melting point is, for example, above 50° C. are also suitable.

According to the invention, the antifoams and/or deaerators contain, in the hydrophobic phase, combinations of
(i) at least one polyglyceryl ester which is obtainable by at least 20% esterification of polyglycerol with a carboxylic acid of 12 to 36 carbon atoms and
(ii) at least one bisamide of ethylenediamine and carboxylic acids of 10 to 36 carbon atoms.

The amount of the polyglyceryl esters in the hydrophobic phase of the oil-in-water dispersions is, for example, from 0.5 to 80, preferably from 2 to 20, % by weight. The weight ratio of (i) polyglyceryl esters to (ii) bisamides is, for example, from 10:1 to 1:10, preferably from 3:1 to 1.5:1. Suitable polyglyceryl esters (i) have already been mentioned above. Bisamides of ethylenediamine and carboxylic acids of 10 to 36 carbon atoms are described, for example, in WO-A-94/20680. Particularly preferably used amides (ii) are ethylenebisstearamide, ethylenebisbehenamide and/or ethylenebislauramide. The oil phase of the oil-in-water dispersions preferably contains at least one fatty alcohol having 12 to 26 carbon atoms in the molecule, at least one glyceryl ester of fatty acids of 12 to 26 carbon atoms, preferably 12 to 22 carbon atoms, and at least one mineral oil in combination with (i) a polyglyceryl ester and at least one bisamide (ii).

The hydrophobic phase accounts, for example, for from 5 to 60, preferably from 10 to 50, in particular from 10 to 35, % by weight of the oil-in-water dispersions. The amount of the aqueous phase of the dispersions is obtained therefrom in each case as the additional amount to 100% by weight, and is, for example, from 95 to 25% by weight.

The abovementioned compounds which are effective as antifoams and/or deaerators are used, either alone or as a mixture with one another, in combination with components (i) and (ii) for the preparation of the novel antifoam and deaerator dispersions. They may be mixed with one another in any desired ratio. The mixing of the compounds and also the emulsification in water are effected at relatively high temperatures. The active components which form the oil phase of the antifoam mixture are heated, for example, to above 40° C., e.g. from 70 to 140° C., and emulsified under the action of shear forces in water, so that oil-in-water emulsions are obtained. Commercial apparatuses are used for this purpose. The mean particle size of the dispersed hydrophobic phase is, for example, in general from 0.4 to 40 µm, preferably from 0.5 to 10 µm.

The finely divided oil-in-water emulsions thus obtained are stabilized, for example a stabilizer is added, for example water-soluble, amphiphilic copolymers having acid groups or water-soluble salts of said copolymers. Here, it is possible, for example, to add from 0.01 to 3% by weight, based on the total emulsion, of a water-soluble amphiphilic copolymer having acid groups or of a water-soluble salt thereof to the oil-in-water emulsion directly after homogenization, or to emulsify the compounds acting as antifoams and/or deaerators in an aqueous solution of a water-soluble, amphiphilic copolymer having acid groups or of a salt thereof. In this way, dispersions having a long shelf life are obtained after cooling to room temperature.

The novel oil-in-water dispersions can, if required, contain finely divided, virtually water-insoluble, inert solids having particle sizes of less than 20 µm, preferably from 0.1 to 10 µm, in an amount of, for example, from 0.1 to 50, preferably from 1 to 35, % of the weight of the oil phase of the oil-in-water dispersions. Suitable inert solids are, for example, kaolin, chalk, bentonite, talc, barium sulfate, silica, urea/formaldehyde pigments, melamine/formaldehyde pigments and microcrystalline cellulose. The use of said solids in antifoams is disclosed in DE-A-36 01 929.

Antifoam dispersions which contain, as a stabilizer, from 0.01 to 3% by weight of a water-soluble, amphiphilic copolymer having acid groups or of a salt thereof are particularly advantageous.

Further advantageous antifoam dispersions contain, as a stabilizer, from 0.1 to 3% by weight, based on the oil-in-water dispersions, of at least one
  polymer of monoethylenically unsaturated acids having molar masses of from 1 500 to 300 000,
  graft polymer of from 5 to 40 parts by weight of N-vinylformamide on 100 parts by weight of a polyalkylene glycol having a molar mass of from 500 to 10 000,
  zwitterionic polyalkylenepolyamine,
  zwitterionic polyethyleneimine,
  zwitterionic polyetherpolyamine or
  zwitterionic crosslinked polyalkylenepolyamine.

Antifoams and/or deaerators which contain, as a stabilizer, homopolymers of acrylic acid, homopolymers of methacrylic acid, copolymers of acrylic acid and methacrylic acid, copolymers of acrylic acid and maleic acid, copolymers of methacrylic acid and maleic acid, polyvinylsulfonic acid, polyacrylamido-2-methylpropanesulfonic acid or their alkali metal and ammonium salts having molar masses of from 1 500 to 300 000 are preferred.

However, the novel dispersions may also contain conventional nonionic, anionic, amphoteric and/or cationic emulsifiers as sole stabilizers or as coemulsifiers. They are used, for example, in amounts of from 0.01 to 3% by weight for stabilizing oil-in-water dispersions. They are, for example, customary surface-active substances which are compatible with the other substances of the antifoam dispersion. The surface-active compounds used as sole emulsifier or as coemulsifier with an anionic amphiphilic copolymer may also be used as a mixture with one another. For example, mixtures of anionic and nonionic surface-active substances can be used for further stabilization of the antifoam dispersions. The surface-active compounds suitable as a coemulsifier are described as a component of antifoam formulations in the publications cited in connection with the prior art. Such coemulsifiers are, for example, sodium salts or ammonium salts of higher fatty acids, alkoxylated alkylphenols, oxyethylated unsaturated oils, such as reaction products of one mole of castor oil and from 30 to 40 mol of ethylene oxide, sulfated ethoxylation products of nonylphenol or octylphenol, and their sodium salts or ammonium salts, alkylarylsulfonates, sulfonates of naphthalene and naphthalene condensates, sulfosuccinates and adducts of ethylene oxide and/or propylene oxide with fatty alcohols, polyhydric alcohols, amines or carboxylic acids. Particularly effective coemulsifiers are sulfated alkyldiphenyl oxides, in particular bissulfated alkyldiphenyl oxides, such as bissulfated dodecyldiphenyl oxide.

If the polymeric stabilizers are not sufficiently water-soluble in the form of the free acid, they are used in the form of water-soluble salts, for example the corresponding alkali metal, alkaline earth metal and ammonium salts. These salts are prepared, for example, by partial or complete neutralization of the free acid groups of the amphiphilic copolymers with bases, for example sodium hydroxide solution, potassium hydroxide solution, magnesium oxide, ammonia or amines, such as triethanolamine, ethanolamine, morpholine, triethylamine or butylamine, being used for the neutralization. The acid groups of the amphiphilic copolymers are preferably neutralized with ammonia or sodium hydroxide solution.

The amphiphilic copolymers contain units of
(a) hydrophobic monoethylenically unsaturated monomers and
(b) monoethylenically unsaturated carboxylic acids, monoethylenically unsaturated sulfonic acids, monoethylenically unsaturated phosphonic acids or mixtures thereof.

Suitable hydrophobic monoethylenidally unsaturated monomers
(a) are, for example, styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, isobutene, diisobutene, styrene and acrylic esters, such as ethyl acrylate, isopropyl acrylate, n-butyl acrylate and sec-butyl acrylate, are preferably used.

The amphiphilic copolymers contain, as hydrophilic monomers,
(b) preferably acrylic acid, methacrylic acid, maleic acid, maleic anhydride, itaconic acid, vinylsulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid or mixtures thereof in polymerized form.

The molar mass of the amphiphilic copolymers is, for example, from 1 000 to 100 000, preferably from 1 500 to 10 000. The acid numbers of the amphiphilic copolymers are, for example, from 50 to 500, preferably from 150 to 350, mg KOH/g of polymer.

Stabilizers based on amphiphilic copolymers are particularly preferred, the copolymers containing
(a) from 95 to 45% by weight of isobutene, diisobutene, styrene or mixtures thereof and
(b) from 5 to 55% by weight of acrylic acid, methacrylic acid, maleic acid, monoesters of maleic acid or mixtures thereof as polymerized units. Particularly preferably used copolymers are those which contain
(a) from 45 to 80% by weight of styrene,
(b) from 55 to 20% by weight of acrylic acid and, if required,
(c) additionally further monomers as polymerized units. If required, the copolymers may contain units of monoesters of maleic acid as further monomers (c) in the form of polymerized units. Such copolymers are obtainable, for example, by preparing copolymers of styrene, diisobutene or isobutene or mixtures thereof with maleic anhydride in the absence of water and reacting the copolymers with alcohols after the polymerization, from 5 to 50 mol % of a monohydric alcohol being used per mole of anhydride groups in the copolymer. Suitable alcohols are, for example, methanol, ethanol, n-propanol, isopropanol, n-butanol, isobutanol and tert-butanol. However, the anhydride groups of the copolymers may also be reacted with polyhydric alcohols, such as glycol or glycerol.

However, the reaction is carried out here until only one OH group of the polyhydric alcohol reacts with the anhydride group. If not all the anhydride groups of the copolymers are reacted with alcohols, the ring opening of the anhydride groups not reacted with alcohols is effected by adding water.

Other compounds to be used as a stabilizer are, for example, commercial polymers of monoethylenically unsaturated acids and graft polymers of N-vinylformamide on polyalkylene glycols, which are described, for example, in WO-A-96/34903. If required, up to 10% of the grafted-on vinylformamide units may be hydrolyzed. The amount of grafted-on vinylformamide units is preferably from 20 to 40% by weight, based on polyalkylene glycol. Polyethylene glycols having molar masses of from 2 000 to 10 000 are preferably used.

The zwitterionic polyalkylenepolyamines and zwitterionic polyethyleneimines also suitable as stabilizers are disclosed, for example, in EP-B-0112592. Such compounds are obtainable, for example, by first alkoxylating a polyalkylenepolyamine or polyethyleneimine, for example with ethylene oxide, propylene oxide and/or butylene oxide, and then quaternizing the alkoxylation products, for example with methyl bromide or dimethyl sulfate, and then sulfating the quaternized, alkoxylated products with chlorosulfonic acid or sulfur trioxide. The molar mass of the zwitterionic polyalkylenepolyamines is, for example, from 1 000 to 9 000, preferably from 1 500 to 7 500. The zwitterionic polyethyleneimines preferably have molar masses of from 2 000 to 1 700 Dalton.

The aqueous phase can, if required, contain a thickener, for example high molecular weight polymers having an average molar mass Mw of more than 1 million. Such thickeners for oil-in-water antifoam mixtures are disclosed, for example, in EP-A-0 142 812. They are, for example, polyacrylamides, polyacrylic acids or copolymers of acrylic acid with acrylamide.

The novel antifoams and/or deaerators are very effective in aqueous systems which tend to foam, both at room temperature and at higher temperatures, for example at above 35° C., preferably >52° C. Compared with known antifoams, they have a substantially improved long-term effect. The oil-in-water dispersions are preferably used as antifoams and/or deaerators for foam control of aqueous media which tend to form foam, for example in papermaking, in the food industry and the starch industry and in wastewater treatment plants. Of particular interest, however, is the use of the antifoams and/or deaerators for foam control in pulp cooking, pulp washing, the beating of paper stock, papermaking and the dispersing of pigments for papermaking. In these processes, the temperature of the aqueous medium to be defoamed is in general above 50° C., for example from 52 to 75° C. The novel mixtures based on oil-in-water dispersions act both as antifoams and as deaerators. In some cases, the deaerator effect is more pronounced than the antifoam effect. They can be used as antifoams or deaerators. They are also advantageously used in engine sizing and surface sizing of paper. When these mixtures are used in paper stock suspensions, for example, their deaerating effect is of primary importance. For example, up to 0.5, preferably from 0.002 to 0.3, % by weight, based on 100 parts by weight of paper stock, of the deaerators are used in a foam-forming medium.

In the examples which follow, parts and percentages are by weight, unless stated otherwise.

EXAMPLES

The deaerating, antifoam effect was determined with the aid of a Sonica measuring apparatus, the amount added to a 0.42% strength paper stock suspension at 60° C. being exactly sufficient to give a concentration of 5 ppm, based on the fat phase (active substance), of antifoam. The air content was determined continuously by means of ultrasonic attenuation before the metering of the antifoam and during the first 5 minutes after the metering. The air content initially decreased and increased again before the end of the measurement. In the tables, the minimum air content of the paper stock suspension is stated in % by volume in each case. This method of measurement is described in TAPPI Journal, 71 (1988), 65-69.

Said paper stock suspension was used in all examples and comparative examples. Before addition of a deaerator, it contained 1.6% by volume of air. In the table, the air content in % by volume after metering of the deaerator is stated under the heading minimum air content. The lower this number, the more effective is the deaerator.

The long-term effect of the antifoam or deaerator was determined by comparing the air content of the paper stock suspension after 5 minutes with the minimum air content (immediately after the metering of the deaerator). The value stated in the table for the long-term effect is the difference between the value for the deaerating effect after 5 minutes and the value measured immediately after the metering. The lower the value, the better is the long-term effect.

The stated particle sizes are mean values which were determined with the aid of a Coulter LS 230 apparatus on about 0.01% strength dispersions. The apparatus operates according to the Fraunhofer diffraction principle.

The viscosities were determined in a Brookfield rotation viscometer (digital model RV TDV-II).

A Fryma colloid mill, type MZ 50/A (Fryma-Maschinenbau GmbH, D-79603 Rheinfelden), was used for dispersing.

Example 1

The oil phase consisted of the following components:

19.4 parts of a fatty alcohol mixture of $C_{12}$- to $C_{26}$-alcohols 0.8 part of ethylenebisstearamide 5 parts of a glyceryl ester of $C_{12}$- to $C_{22}$-fatty acids 1.0 part of mineral oil (commercial white oil) and 2.3 parts of a polyglyceryl ester which was prepared by 75% esterification of a polyglycerol mixture of 30% of diglycerol, 42% of triglycerol, 17% of tetraglycerol and 11% of polyglycerols having a higher degree of condensation with a $C_{12}$- to $C_{26}$-fatty acid mixture.

The aqueous phase consisted of 70 parts of water 3 parts of a 35% strength by weight emulsifier which is obtainable by an addition reaction of 25 mol of ethylene oxide with 1 mol of isooctylphenol and esterification of the adduct with sulfuric acid to give the monoester, 0.45 part of a 31% strength water-in-oil emulsion of an anionic polyacrylamide (sodium salt of a copolymer of 30% of acrylic acid and 70% of acrylamide) and 0.3 part of 30% strength aqueous formaldehyde solution.

The components of the oil phase were first heated to 125° C. and added to the aqueous phase heated to 90° C., with stirring and dispersing. The emulsion was rapidly cooled to 25° C. with constant stirring. The resulting dispersion had a viscosity of 560 mPa·s and a mean particle size of 3.05 µm.

Comparative Example 1

The oil phase consisted of the following components:

20.2 parts of a fatty alcohol mixture of $C_{12}$- to $C_{26}$-alcohols 5 parts of a glyceryl ester of $C_{12}$- to $C_{22}$-fatty acids 1 part of mineral oil (commercial white oil) and 2.3 parts of a polyglyceryl ester prepared by 75% esterification of a polyglycerol mixture of 30% of diglycerol, 42% of triglycerol, 17% of tetraglycerol and 11% of polyglycerols having a higher degree of condensation with a $C_{12}$- to $C_{26}$-fatty acid mixture.

The aqueous phase consisted of 70 parts of water 3 parts of a 35% strength by weight emulsifier which is obtainable by an addition reaction of 25 mol of ethylene oxide with 1 mol of isooctylphenol and esterification of the adduct with sulfuric acid to give the monoester, 0.45 part of a 31% strength water-in-oil emulsion of an anionic polyacrylamide (sodium salt of a copolymer of 30% of acrylic acid and 70% of acrylamide) and 0.3 part of 30% strength aqueous formaldehyde solution.

The components of the oil phase were first heated to 125° C. and added to the aqueous phase heated to 90° C., with stirring and dispersing. The emulsion was rapidly cooled to 25° C. with constant stirring. The resulting dispersion had a viscosity of 480 mPa·s and a mean particle size of 3.15 µm.

Example 2

The oil phase comprising 22.7 parts of a mixture of 3-thia-$C_{20}$-$C_{28}$-alkan-1-ols, prepared according to the example for thiaalkanol A of WO-A-00/44470, page 20, 2.5 parts of a glyceryl ester of $C_{12}$- to $C_{22}$-fatty acids 0.9 part of ethylenebisstearamide 2.3 parts of a polyglyceryl ester prepared by 75% esterification of a polyglyceryl mixture of 30% of diglycerol 42% of triglycerol 17% of tetraglycerol and 11% of polyglycerols having a high degree of condensation with a $C_{12}$- to $C_{26}$-fatty acid mixture was melted at 125° C. under an $N_2$ atmosphere, a homogeneous melt being obtained. This was emulsified with the aid of a disperser in a solution at 90° C. and comprising 1.8 parts of a 42% strength by weight aqueous ammoniacal solution of a polymer based on 50 parts by weight of styrene and 50 parts by weight of acrylic acid (obtainable from S.C. Johnson under the name Joncryl EEC 207), 0.45 part of a 31% strength by weight water-in-oil emulsion of an anionic polyacrylamide (sodium salt of a copolymer of 30% by weight acrylic acid and 70% by weight of acrylamide), 0.3 g of 30% strength aqueous formaldehyde solution and 0.04 g of 10% strength sulfuric acid and 70 g of water. A homogeneous emulsion was obtained. This emulsion was rapidly cooled to room temperature, a dispersion being obtained (curing of the oil droplets). The mean particle size of was 2.85 µm and the viscosity 370 mPa·s.

Comparative Example 2

23.5 parts of a mixture of 3-thia-$C_{20}$-$C_{28}$-alkan-1-ols, prepared according to the example for thiaalkanol A of WO-A-00/44470, page 20, 2.5 parts of a glyceryl ester of $C_{12}$- to $C_{22}$-fatty acids, 2.3 parts of a polyglyceryl ester prepared by 75% esterification of a polyglycerol mixture of 30% of diglycerol, 42% of triglycerol, 17% of tetraglycerol and 11% of polyglycerols having a higher degree of condensation with a $C_{12}$- to $C_{26}$-fatty acid mixture were melted at 125° C. under an $N_2$ atmosphere, a homogeneous melt being obtained. This was emulsified with the aid of a disperser in a solution at 90° C. and comprising 1.7 parts of a 42% strength by weight aqueous ammoniacal solution of a polymer based on 50 parts by weight of styrene and 50 parts by weight of acrylic acid (obtainable from S.C. Johnson under the name Joncryl EEC 207), 0.45 part of a 31% strength water-in-oil emulsion of an anionic polyacrylamide (sodium salt of a copolymer of 30% of acrylic acid and 70% of acrylamide), 0.04 g of 10% sulfuric acid, 0.3 g of 30% strength aqueous formaldehyde solution and 70 g of water.

A homogeneous emulsion was obtained. This emulsion was rapidly cooled to room temperature, a dispersion being obtained (curing of the oil droplets). The mean particle size was 2.7 µm and the viscosity 330 mPa·s.

Example 3

The oil phase consisted of the following components:

17.0 parts of a fatty alcohol mixture of $C_{12}$- to $C_{26}$-alcohols 2 parts of natural oil based on a glyceryl ester of $C_{12}$- to $C_{22}$-fatty acids 1.3 parts of ethylenebisstearamide 0.5 part of beeswax 4 parts of paraffin, m.p. 60/62° C.

1.8 parts of a polyglyceryl ester prepared by 75% esterification of a polyglycerol mixture of 30% of diglycerol, 42% of triglycerol, 17% of tetraglycerol and 11% of polyglycerols having a higher degree of condensation with a $C_{12}$- to $C_{26}$-fatty acid mixture.

The aqueous phase consisted of 70 parts of water, 2 parts of 45% strength sodium dodecylbenzenesulfonate, 2.1% by weight of china clay slurry (70% strength) having a mean particle size of 1.5 µm, 0.3 part of a 31% strength water-in-oil emulsion of an anionic polyacrylamide (sodium salt of a copolymer of 30% of acrylic acid and 70% of acrylamide) and 0.3 part of 30% strength aqueous formaldehyde solution.

The components of the oil phase were first heated to 125° C. and added to the aqueous phase at 90° C. with stirring and dispersing. The emulsion was rapidly cooled to 25° C. with constant stirring. The resulting dispersion had a viscosity of 780 mPa·s and a mean particle size of 3.5 µm.

Comparative Example 3

The oil phase consisted of the following components:

18.3 parts of a fatty alcohol mixture of $C_{12}$- to $C_{26}$-alcohols, 2 parts of natural oil based on a glyceryl ester of $C_{12}$- to $C_{22}$-fatty acids, 0.5 part of beeswax, 4 parts of paraffin, m.p. 60/62° C. and 1.8 parts of a polyglyceryl ester prepared by 75% esterification of a polyglycerol mixture of 30% of diglycerol, 42% of triglycerol, 17% of tetraglycerol and 11% of polyglycerols having a higher degree of condensation with a $C_{12}$- to $C_{26}$-fatty acid mixture.

The aqueous phase consisted of 70 parts of water, 2 parts of 45% strength sodium dodecylbenzenesulfonate, 2.1% by weight of china clay slurry (70% strength) having a mean particle size of 1.5 µm, 0.3 part of a 31% strength water-in-oil emulsion of an anionic polyacrylamide (sodium salt of a copolymer of 30% of acrylic acid and 70% of acrylamide) and 0.3 part of 30% strength aqueous formaldehyde solution.

The components of the oil phase were first heated to 125° C. and added to the aqueous phase at 90° C. with stirring and dispersing. The emulsion was rapidly cooled to 25° C. with constant stirring. The resulting dispersion had a viscosity of 820 mPa·s and a mean particle size of 3.6 µm.

Comparative Example 4

The oil phase consisted of the following components:

20.7 parts of a fatty alcohol mixture of $C_{12}$- to $C_{26}$-alcohols, 2 parts of natural oil based on a glyceryl ester of $C_{12}$- to $C_{22}$-fatty acids, 1.3 parts of ethylenebisstearamide, 0.5 part of beeswax, 4 parts of paraffin, m.p. 60/62° C., and the aqueous phase consisting of 70 parts of water, 2 parts of 45% strength sodium dodecylbenzenesulfonate, 0.3 part of a 31% strength water-in-oil emulsion of an anionic polyacrylamide (sodium salt of a copolymer of 30% of acrylic acid and 70% of acrylamide) and 0.3 part of 30% strength aqueous formaldehyde solution.

The components of the oil phase were first heated to 125° C. and added to the aqueous phase at 90° C. with stirring and dispersing. The emulsion was rapidly cooled to 25° C. with constant stirring. The resulting dispersion had a viscosity of 910 mPa·s and a mean particle size of 3.6 μm.

The oil-in-water dispersions prepared according to the examples and comparative examples were tested by the methods described above with regard to their antifoam or deaerating effect when used in amounts of 5 or 3 ppm, based on dry paper stock. The results are shown in the table.

TABLE

| | | Air content in % by volume with use of | | | |
| | | 5 ppm, based on dry matter, of deaerator | | 3 ppm, based on dry matter, of deaerator | |
| Example | Comparative example | lowest value | average over 5 min | lowest value | average over 5 min |
| --- | --- | --- | --- | --- | --- |
| 1 | — | 0.40 | 0.68 | 0.83 | 1.02 |
| — | 1 | 0.85 | 1.1 | 1.01 | 1.22 |
| 2 | — | 0.38 | 0.75 | 0.98 | 1.20 |
| — | 2 | 0.82 | 1.03 | 1.03 | 1.18 |
| 3 | — | 0.42 | 0.72 | 0.80 | 1.05 |
| — | 3 | 0.88 | 1.12 | 0.98 | 1.21 |
| — | 4 | 1.01 | 1.23 | 1.10 | 1.22 |

As shown by the results of the measurements, the combination of polyglyceryl esters with ethylenebisstearamide has an improved effect compared with the use of the individual components.

We claim:

1. An antifoam and/or deaerator based on an oil-in-water dispersion comprising an oil phase of at least one hydrophobic compound and an aqueous phase which comprises at least one stabilizer, water and, optionally, a thickener, wherein the oil-in-water dispersion comprises a combination of
    component (i) at least one polyglyceryl ester which is obtained by at least 20% esterification of polyglycerol with a carboxylic acid of 12 to 36 carbon atoms and
    component (ii) at least one bisamide of ethylenediamine and carboxylic acids of 10 to 36 carbon atoms,
    wherein the hydrophobic compound is selected from the group consisting of the alcohols of at least 12 carbon atoms, mono-, di- and triglycerides of fatty acids, fatty acid esters of carboxylic acids of at least 12 carbon atoms and monohydric to tetrahydric alcohols of 1 to 24 carbon atoms, 3-thiaalkan-1-ols, 3-thiaoxoalkan-1-ols, 3-thiadioxoalkanols, esters of the thiaalkane compounds and mixtures thereof, and
    wherein the dispersion excludes fatty acids of 12 to 26 carbon atoms and alkoxylated fatty alcohols.

2. An antifoam and/or deaerator as claimed in claim 1, wherein the hydrophobic compound is selected from the group consisting of the alcohols of at least 12 carbon atoms, mono-, di- and triglycerides of fatty acids, fatty acid esters of carboxylic acids of at least 12 carbon atoms and monohydric to trihydric alcohols of 3 to 22 carbon atoms, 3-thiaalkan-1-ols, 3-thiaoxoalkan-1-ols, 3-thiadioxoalkanols, esters of the thiaalkane compounds and mixtures thereof.

3. An antifoam and/or deaerator as claimed in claim 1, wherein the weight ratio of (i) polyglyceryl esters to (ii) bisamides is from 10:1 to 1:10.

4. An antifoam and/or deaerator as claimed in claim 1, wherein the weight ratio (i) polyglyceryl esters to (ii) bisamides is from 3:1 to 1.5:1.

5. An antifoam and/or deaerator as claimed in claim 1, wherein the oil phase comprises at least one fatty alcohol with 12 to 26 carbon atoms in the molecule, at least one glyceryl ester of fatty acids of 12 to 26 carbon atoms and at least one mineral oil.

6. An antifoam and/or deaerator as claimed in claim 1, wherein the amount of the hydrophobic phase of the oil phase in the composition of the oil-in-water dispersion is from 5 to 60% by weight and the amount of the aqueous phase is from 95 to 40% by weight.

7. An antifoam and/or deaerator as claimed in claim 6, wherein the amount of the hydrophobic phase of the oil phase in the composition of the oil-in-water dispersion is from 10 to 50% by weight.

8. An antifoam and/or deaerator as claimed in claim 6, wherein the amount of the hydrophobic phase of the oil phase in the composition of the oil-in-water dispersion is from 10 to 35% by weight.

9. An antifoam and/or deaerator as claimed in claim 1, wherein the oil-in-water dispersion contains from 0.1 to 50% by weight of said at least one polyglyceryl ester.

10. An antifoam and/or deaerator as claimed in claim 1, which contains ethylenebisstearamide as bisamide (ii).

11. An antifoam and/or deaerator as claimed in claim 1, wherein the polyglycerol used to make the polyglyceryl ester is obtained from a mixture of diglycerol, triglycerol, tetraglycerol and polyglycerols having a higher degree of condensation.

12. A method for foam control comprising adding an antifoam and/or deaerator as claimed in claim 1 to a process.

13. A method as claimed in claim 12 wherein said process is a process for making paper.

14. A paper made by the process as claimed in claim 13.

15. A method as claimed in claim 12 wherein said process is pulp cooking, pulp washing, paper stock beating, papermaking and pigment dispersing.

16. An antifoam and/or deaerator based on an oil-in-water dispersion comprising an oil phase of at least one hydrophobic compound and an aqueous phase which comprises at least one stabilizer, water and, optionally, a thickener, wherein the oil-in-water dispersion comprises a combination of
    component (i) at least one polyglyceryl ester which is obtained by at least 20% esterification of polyglycerol with a carboxylic acid of 12 to 36 carbon atoms and
    component (ii) at least one bisamide of ethylenediamine and carboxylic acids of 10 to 36 carbon atoms,
    wherein the hydrophobic compound is selected from the group consisting of alcohols of at least 12 carbon atoms and 3-thiaalkan-1-ols, and
    wherein the dispersion excludes fatty acids of 12 to 26 carbon atoms.

17. An antifoam and/or deaerator as claimed in claim 16, wherein the hydrophobic compound comprises at least one alcohol of at least 12 carbon atoms.

18. An antifoam and/or deaerator as claimed in claim 16, wherein the hydrophobic compound comprises at least one 3-thiaalkan-1-ol.

* * * * *